United States Patent
Rehnby et al.

(10) Patent No.: US 12,549,688 B2
(45) Date of Patent: Feb. 10, 2026

(54) ESTABLISHING, DOCUMENTING, AND DISCLOSING INFORMATION PERTINENT TO PRIVACY IN SURVEILLED ENVIRONMENTS

(71) Applicant: Verkada Inc., San Mateo, CA (US)

(72) Inventors: Karl Erik Gustav Rehnby, San Francisco, CA (US); Julia Lin, Fremont, CA (US); Arjun Krishnaiah, San Francisco, CA (US); Matthew Timothy Bornski, San Jose, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/318,150

(22) Filed: May 16, 2023

(65) Prior Publication Data
US 2023/0379438 A1 Nov. 23, 2023

Related U.S. Application Data

(60) Provisional application No. 63/364,800, filed on May 16, 2022.

(51) Int. Cl.
*H04N 7/18* (2006.01)
*G06Q 50/26* (2024.01)

(52) U.S. Cl.
CPC .............. *H04N 7/181* (2013.01); *G06Q 50/26* (2013.01)

(58) Field of Classification Search
CPC .. H04N 7/181; H04N 7/18–188; G06Q 50/26; G08B 13/196–19697; G06T 2207/30221–30236
See application file for complete search history.

(56) References Cited

U.S. PATENT DOCUMENTS 11,228,878 B1 * 1/2022 Paran ................. H04Q 9/00
2006/0252530 A1 * 11/2006 Oberberger ......... G07F 17/3239
463/29

(Continued)

FOREIGN PATENT DOCUMENTS

KR 20110029960 A * 3/2011
KR 101545080 B1 * 8/2015

(Continued)

OTHER PUBLICATIONS

Nikouei, Seyed Yahya, et al. "Toward intelligent surveillance as an edge network service (isense) using lightweight detection and tracking algorithms." IEEE Transactions on Services Computing 14.6 (2019): 1624-1637. (Year: 2019).*

(Continued)

*Primary Examiner* — Jung W Kim
*Assistant Examiner* — Sameera Wickramasuriya
(74) *Attorney, Agent, or Firm* — PERKINS COIE LLP

(57) ABSTRACT

Introduced here is a surveillance system that is able to employ an approach to sharing security information, such that organizations have the ability to voluntarily share relevant security information with the individuals who frequent the corresponding buildings. The surveillance system introduced here may not only be able to protect the safety of organizations, but also the privacy of users. In order for a member of the public to truly feel safe—not only from material loss or bodily harm—it is crucial for her to know what information is being recorded, stored, and used.

16 Claims, 15 Drawing Sheets

(56) References Cited

U.S. PATENT DOCUMENTS

| | | | | |
|---|---|---|---|---|
| 2018/0343602 A1* | 11/2018 | Baroudi | .............. | H04B 7/2606 |
| 2019/0096209 A1* | 3/2019 | Chen | .................. | G08B 13/2454 |
| 2020/0126404 A1* | 4/2020 | Edwards | .......... | G08G 1/096791 |
| 2020/0357276 A1* | 11/2020 | Yang | ................... | G06F 21/6245 |
| 2021/0142635 A1* | 5/2021 | Chen | ............... | G08B 13/19682 |
| 2021/0385417 A1* | 12/2021 | Park | ..................... | G06F 3/0484 |

FOREIGN PATENT DOCUMENTS

| | | | |
|---|---|---|---|
| KR | 101929981 B1 | | 12/2018 |
| KR | 10-2364898 | * | 2/2022 |
| KR | 102364898 B1 | | 2/2022 |
| KR | 102367958 B1 | * | 2/2022 |

OTHER PUBLICATIONS

Upmanyu, Maneesh, et al. "Efficient privacy preserving video surveillance." 2009 IEEE 12th international conference on computer vision. IEEE, 2009. (Year: 2009).*

International Search Report and Written Opinion for WO Patent Application No. PCT/US23/67042 mailed Sep. 12, 2023; 11 pages.

* cited by examiner

Privacy & Security Disclosure

Bellings School District is partnered with Verkada to provide on-premises security solutions.

To preserve your privacy, Bellings School District has elected to:
- NOT record audio.
- NOT utilize face recognition.

If you have any further questions about Bellings School District security, please contact:

Jane Doe
Principal at Glendale Elementary
jane.doe@bellingsschooldistrict.com

FIG. 8A

Bellings School District

Privacy & Security Disclosure

Bellings School District is partnered with Verkada to provide on-premises security solutions. We use Verkada products to manage:

   

To preserve your privacy, Bellings School District has elected to:
- NOT record audio.
- NOT utilize face recognition.

Read more about Verkada and their mission to protect privacy by visiting verkada.com/mission.

If you have any further questions about Bellings School District security, please contact:

Jane Doe
Principal at Glendale Elementary
jane.doe@bellingsschooldistrict.com

FIG. 8B

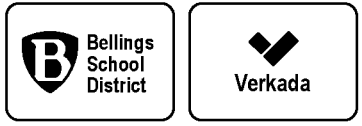

Privacy & Security Disclosure

Bellings School District is partnered with Verkada to provide on-premises security solutions. We use Verkada products to manage:

To preserve your privacy, Bellings School District has elected to:
- NOT record audio.
- NOT utilize face recognition.

Read more about Verkada and their mission to protect privacy by visiting verkada.com/mission.

If you have any further questions about Bellings School District security, please contact:

Jane Doe
Principal at Glendale Elementary
jane.doe@bellingsschooldistrict.com

Receive input that is indicative of a request, from a user, to create a website for a surveillance system that is employed by an organization to surveil a facility

1102

Cause display of an interface through which the user is able to indicate preferences regarding disclosure of different types of information related to the surveillance system

1103

Create, based on the preferences, the website that is accessible to individuals

Receive input that is indicative of a request, from a user, for information related to a surveillance system employed by an organization to monitor an environment

1202

Query a network-accessible platform for information related to the surveillance system that the organization has opted to make publicly accesible

1203

Cause presentation of an interface that includes the information received from the network-accessible platform in response to the query

Receive first input that is representative of an approval from an organization whose premises are being monitored by a surveillance system to disclose information related to (i) edge devices included in the surveillance system and/or (ii) features of the surveillance system

1302

Receive second input that is representative of an indication that a computing device is proximate to the premises of the organization

1303

Cause digital presentation of the information, so as to convey the information to a user of the computing device

FIG. 13

ESTABLISHING, DOCUMENTING, AND DISCLOSING INFORMATION PERTINENT TO PRIVACY IN SURVEILLED ENVIRONMENTS

CROSS-REFERENCE TO RELATED APPLICATIONS

This application claims priority to U.S. Provisional Application No. 63/364,800, titled "Approaches to Sharing Pertinent Security Information with the Public" and filed on May 16, 2022, which is incorporated by reference in its entirety.

TECHNICAL FIELD

Various embodiments concern surveillance systems and associated approaches for disclosing information that is generated by, or available to, those surveillance systems with the public.

BACKGROUND

The term "surveillance" refers to the monitoring of behavior, activities, and other changing information for the purpose of protecting people or items in a given environment. Generally, surveillance requires that the given environment be monitored using electronic devices such as digital cameras, lights, locks, door controllers, credential readers, sensors (e.g., that monitor temperature, volatile organic compounds, smoke, carbon monoxide, humidity, noise, motion, etc.) and the like. Collectively, these electronic devices may be referred to as the "edge devices" of a "surveillance system" or "security system." In operation, these edge devices generate data that can be examined in order to establish what has happened in the environment that is under surveillance. As an example, digital cameras may generate data that is representative of digital images of the environment.

Generally, an environment under surveillance is monitored by various types of edge devices, and therefore insights into the environment are gleaned through analysis of different types of data. Assume, for example, that an organization is interested in having a physical building surveilled. Credential readers may be installed near most, if not all, doors that are externally accessible. When credential information—for example, in the form of a coded data stream—is received by a credential reader, the credential reader may determine whether to signal to a corresponding door controller to allow access of the physical building. These "access events" may be catalogued by the credential readers and then information regarding the access events may be provided to a "hub." One example of a hub is a network-accessible server system that is communicatively connected to the edge devices that are responsible for surveilling the physical building.

Information regarding access events may be readily available to security administrators (also called "surveillance administrators" or simply "administrators") of the surveillance system. For example, employees in the information technology department or security department of the organization may be able to access this information for threat analysis purposes. However, little thought has been given to how to disclose what is recorded with the individuals that are involved in the access events. Simply put, the individuals whose access events are being recorded may not know how conduct is being monitored or how conduct is being documented.

BRIEF DESCRIPTION OF THE DRAWINGS

FIGS. 8A-C include examples of physical handouts that could be distributed as a means of sharing pertinent security information.

FIG. 10 includes an example of a customizable website that can be used to create a disclosure for an organization.

FIG. 11 includes a flow diagram of a process for creating a visual representation of security information related to a surveillance system that an organization has opted to make accessible.

FIG. 12 includes a flow diagram of a process for accessing security information related to a surveillance system that is employed by an organization to monitor an environment.

FIG. 13 includes a flow diagram of a process for sharing security information related to a surveillance system employed by an organization to monitor its premises.

Figure 1:
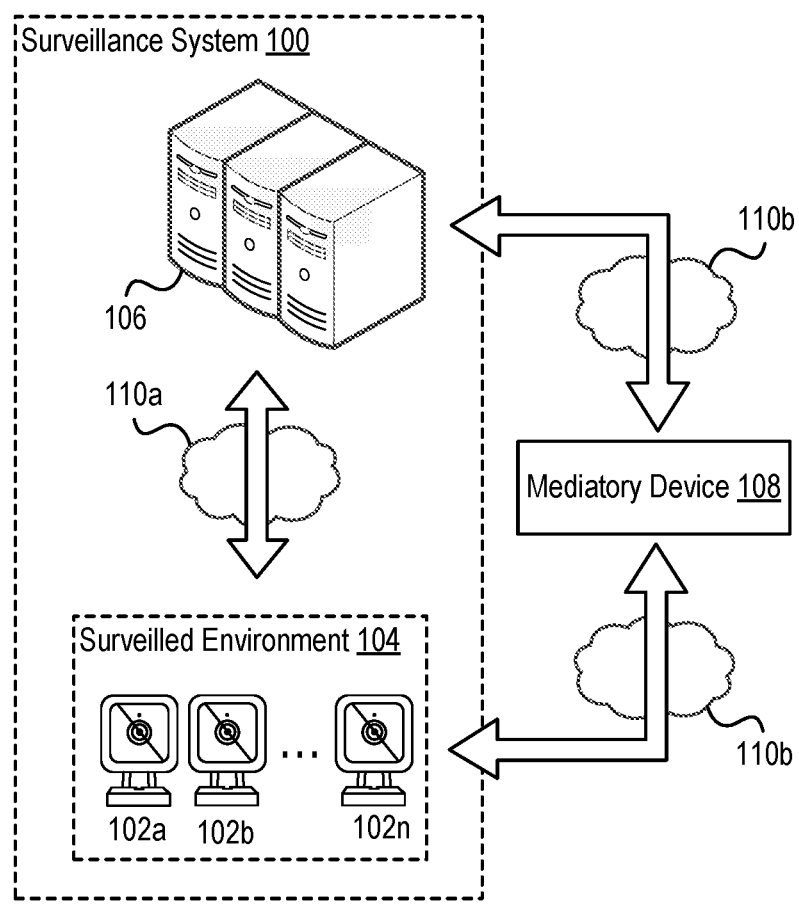
FIG. 1 includes a high-level illustration of a surveillance system that includes various edge devices that are deployed throughout an environment to be surveilled.

Various features of the technology described herein will become more apparent to those skilled in the art from a study of the Detailed Description in conjunction with the drawings. Various embodiments are depicted for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

Surveillance can seem scary. Unless you are an administrator, you are not privy to what information has been recorded by surveillance system, nor are you privy to how the recorded information will be used. Introduced here is a surveillance system that is able to employ an approach to sharing security information, such that organizations have the ability to voluntarily share relevant security information with the individuals who frequent the corresponding buildings. Note that the term "security information" may be used interchangeably with the term "surveillance information," and these terms may be used to refer to any type of data that could be generated by an edge device.

Various companies have developed surveillance systems in an effort to protect the safety of organizations, with little regard to the individuals who frequent the buildings associated with the organizations. These individuals may be referred to as "users" of those conventional surveillance systems. Those conventional surveillance systems are not concerned with protecting the privacy of users, however. Those conventional surveillance systems are focused primarily, if not entirely, on the interests of organizations, and therefore have little concern for the privacy of users.

The surveillance system introduced here may not only be able to protect the safety of organizations, but also the privacy of users. In order for a member of the public to truly feel safe—not only from material loss or bodily harm—it is crucial for her to know what information is being recorded, stored, and used. In an effort to promote honesty and accessibility, it may be appropriate to give users the ability to easily access, view, and share this information. Caution must be taken not to share information that would compromise the safety of organizations (and other users), however. For example, to disclose that a given camera does not record at a certain time would provide a person with malicious intent information that could compromise the safety of an organization.

Embodiments may be described in the context of executable instructions for the purpose of illustration. However, aspects of the present disclosure could be implemented via hardware or firmware in addition to, or instead of, software. For example, instructions for documenting or disclosing pertinent security information may be executed by the processor of a computing device on which related data (e.g., digital images, timestamps for access events) or analyses of such data are viewed through a web browser, mobile application, or desktop application. The computing device may be a mediatory device that is communicatively connected to a surveillance system. As another example, Instructions for documenting or disclosing pertinent security information may be executed by the processor of an edge device that is part of the surveillance system.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense. That is, in the sense of "including but not limited to." Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

Overview of Surveillance System

FIG. 1 includes a high-level illustration of a surveillance system 100 that includes various edge devices 102a-n that are deployed throughout an environment 104 to be surveilled. While the edge devices 102a-n in FIG. 1 are cameras, other types of edge devices could be deployed throughout the environment 104 in addition to, or instead of, cameras. Other examples of edge devices include lights, locks, door controllers, credential readers, sensors (e.g., that monitor temperature, volatile organic compounds, smoke, carbon monoxide, humidity, noise, motion, etc.) and the like. Meanwhile, the environment 104 may be, for example, a home or business.

In some embodiments, these edge devices 102a-n are able to communicate directly with a server system 106 that comprises one or more computer servers (or simply "servers") via a network 110a. In other embodiments, these edge devices 102a-n are able to communicate indirectly with the server system 106 via a mediatory device 108. The mediatory device 108 may be connected to the edge devices 102a-n and server system 106 via respective networks 110b-c. The networks a-c may be personal area networks ("PANs"), local area networks ("LANs"), wide area networks ("WANs"), metropolitan area networks ("MANs"), cellular networks, or the Internet. For example, the edge devices 102a-n may communicate with the mediatory device 108 via Bluetooth®, Near Field Communication ("NFC"), or another short-range communication protocol, and the edge devices 102a-n may communicate with the server system 106 via the Internet. As another example, the edge devices 102a-n may communicate with the mediatory device 108 via Bluetooth, and the mediatory device 108 may communicate with the server system 106 via the Internet or a cellular network.

Generally, a computer program executing on the mediatory device 108 is supported by the server system 106, and thus is able to facilitate communication with the edge devices 102a-n of the surveillance system 100. In some embodiments, the computer program is executable by a web browser, mobile application, or desktop application. In other embodiments, the computer program is representative of a standalone program (e.g., in the form of a mobile application or desktop application). Regardless of its form of implementation, the computer program may be referred to as a "surveillance platform." Accordingly, a surveillance platform may be executed by a web browser in order to document or disclose pertinent security information, or a surveillance platform may be a mobile application or desktop application that is designed to facilitate the review and display of pertinent security information. Therefore, the surveillance platform may be representative of a standalone program that is executable by the mediatory device 108 or implemented as part of a web browser, mobile application, or desktop application that is executable by the mediatory device 108.

Meanwhile, the mediatory device 108 could be, for example, a mobile phone, tablet computer, or wearable electronic device (e.g., a fitness tracker or watch). In some embodiments, the mediatory device 108 is used as a means to access the environment 104. For example, the mediatory device 108 may be presented to one of the edge devices 102a-n in order to gain access to the environment 104. Thus, the mediatory device 108 may periodically enter the environment 104.

Figure 2:
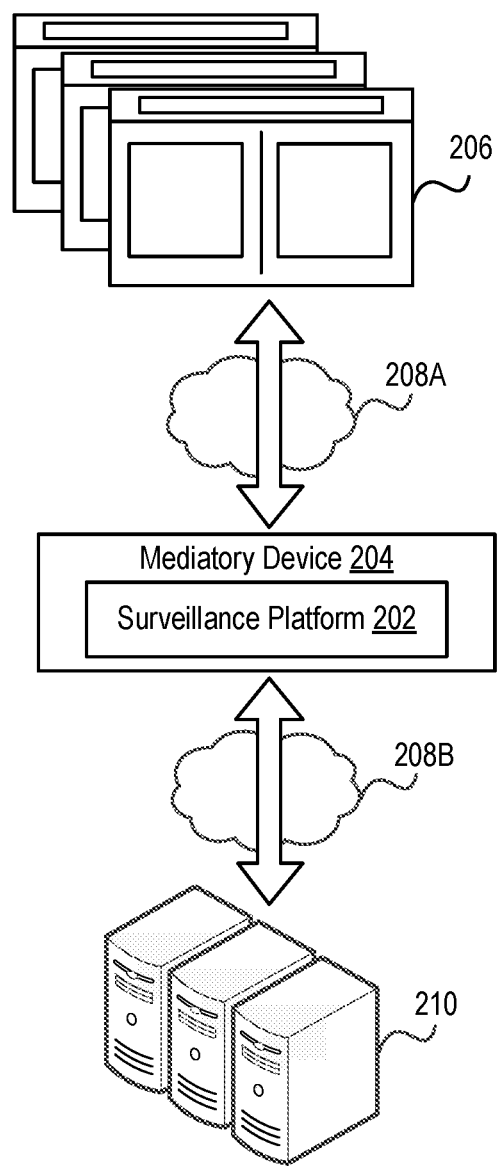
FIG. 2 illustrates a network environment that includes a surveillance platform that is executed by a mediatory device.

FIG. 2 illustrates a network environment 200 that includes a surveillance platform 202 that is executed by a mediatory device 204. An individual (also called a "user") may be able to interact with the surveillance platform 202 via interfaces 206. For example, the surveillance platform 202 may be able to communicate with a surveillance system—and more specifically, its edge devices—so as to allow access to the environment under surveillance. As another example, a user may be able to access an interface through which she can review information related to a surveillance system. Specifically, the user may be able to view information that an organization associated with the surveillance system has opted to make publicly available. Some interfaces are configured to facilitate interactions between users and surveillance systems, while other interfaces are configured to serve as informative dashboards for users. For example, a set of interfaces may be designed to be accessed by individuals whose activities are monitored by the surveillance system, and these interfaces may be accessed through a "subject portal." Another set of interfaces may be designed to be accessed by administrators responsible for reviewing monitored activities or managing the surveillance system, and these interfaces may be accessed through an "administrator portal."

As shown in FIG. 2, the surveillance platform 202 may reside in a network environment 200. Thus, the mediatory device 204 on which the surveillance platform 202 resides may be connected to one or more networks 208A-B. Depending on its nature, the mediatory device 204 could be connected to a PAN, LAN, WAN, MAN, or cellular network. Additionally or alternatively, the mediatory device 204 could be connected to Bluetooth communication channel, NFC communication channel, or another communication channel associated with another short-range communication protocol. For example, if the mediatory device 204 is a mobile phone, then the mediatory device 204 may be accessible to edge devices of a surveillance system via Bluetooth and a server system 210 via a cellular network.

In some embodiments, the surveillance platform 202 is executed or implemented by another computer program executing on the mediatory device 204. Assume, for example, that the mediatory device 204 includes a web browser through which data generated by a surveillance system—or analyses or summaries of that data—can be reviewed. In such a scenario, the surveillance platform 202 may reside on the mediatory device 204 in the form of a browser extension. The term "browser extension," as used herein, may be used to refer to software that, when executed, customizes the abilities of functionalities of a web browser.

In other embodiments, the surveillance platform 202 is executed or supported by a cloud computing service operated by, for example, Amazon Web Services®, Google Cloud Platform™, or Microsoft Azure®. Thus, the mediatory device 204 may be communicatively connected to a server system 210 that comprises multiple computer servers. These computer servers can include rules for permitting access to an environment, algorithms (e.g., for processing data generated by edge devices), user information (e.g., credentials, role, access permissions, etc.), and other assets. Those skilled in the art will recognize that this information could also be distributed amongst the server system 210 and one or more computing devices, including the mediatory device 204.

To conserve processing resources, it is generally preferable to implement the approaches introduced herein on a computing device—like the mediatory device 204 or server system 210—that is not part of the deployed portion of the surveillance system. Said another way, it is generally preferred that the approaches not be implemented by the edge devices that generate the security information of interest. However, edge devices could include a surveillance platform—or at least some of its modules. In such embodiments, an edge device may examine, alter, or document security information prior to transmission of the security information external to the edge device. As an example, if a company has instituted a policy that dictates personally identifying segments of digital images generated by a digital camera will not be maintained, the digital camera may alter (e.g., remove, blur, or otherwise obfuscate) those personally identifying segments prior to transmission of its digital images to the server system 210. In such a scenario, rules related to the processing, analyzing, and retaining of security information may be "pushed" to the edge devices as appropriate. Alternatively, these rules may be created, maintained, and implemented by the server system 210, in which case security information may be transmitted from the edge devices to the server system 210 in its "raw" form.

As mentioned above, aspects of the surveillance platform 202 could be hosted locally, for example, in the form of a computer program executing on the mediatory device 204 that is accessible to a user. Several different versions of computer programs may be available depending on intended use. For example, some embodiments of the surveillance platform 202 are designed to facilitate the sharing of pertinent security information associated with surveillance systems, while other embodiments of the surveillance platform 202 are designed to simply communicate with edge devices of surveillance systems for access control purposes.

Illustrative Examples of Importance of Disclose

Figure 3B:
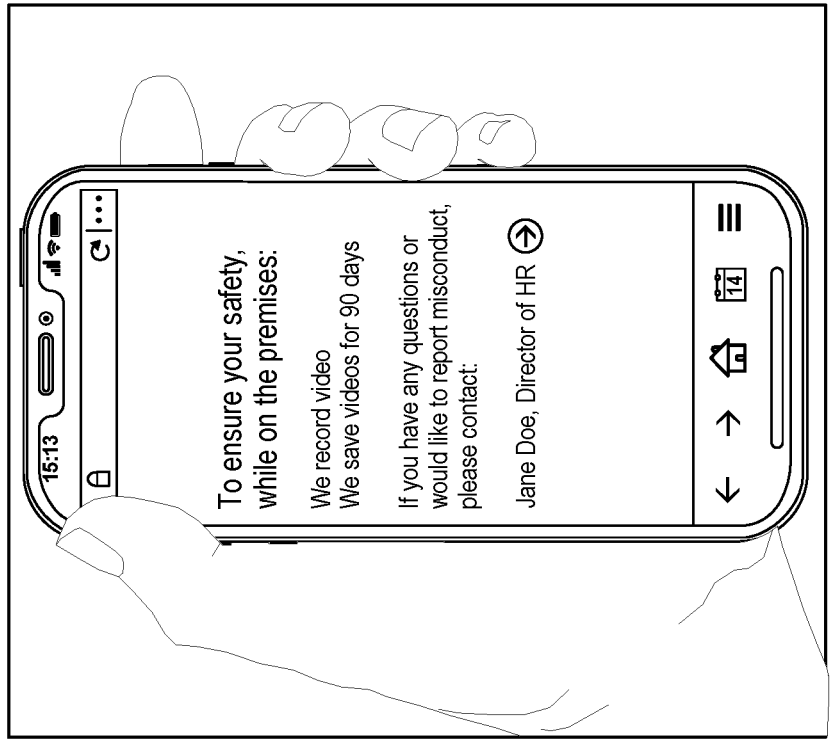
FIG. 3B illustrates how the information may be shown on another interface.
Figure 3A:
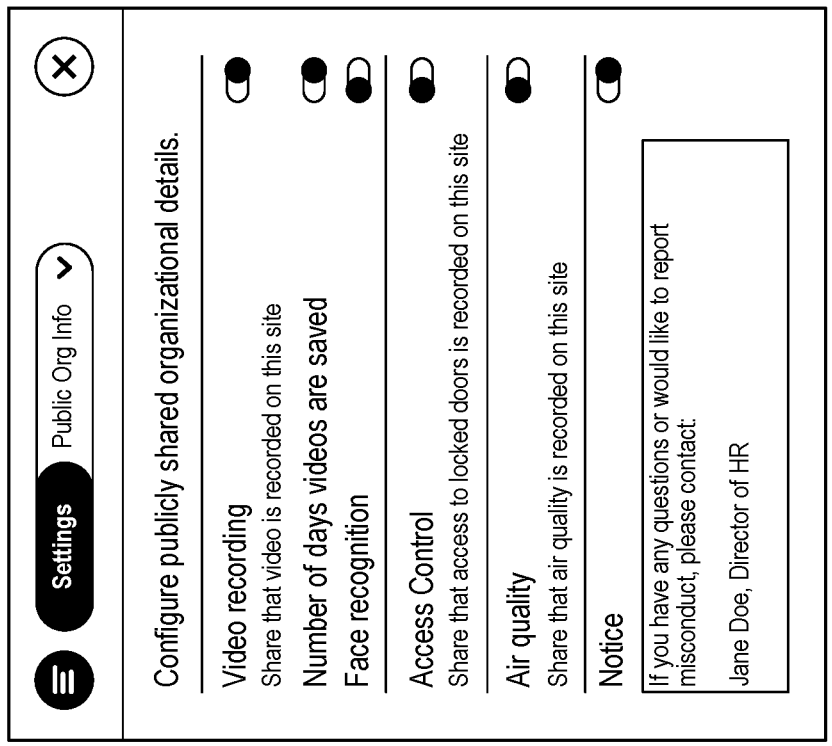
FIG. 3A illustrates an example of an interface through which the information to be made publicly accessible can be specified.

A key consideration in designing a trustworthy surveillance system is how to present pertinent security information to users. One option is to have disclosure appear as an elective feature of the surveillance platform (e.g., surveillance platform 202 of FIG. 2) with simple toggles to decide what information should be made publicly available. Assume, for example, that an administrator is interested in making some information available to the public. In such a situation, the administrator may access an interface that is generated by the surveillance platform and made available through an administrator portal and then specify, through the interface, the information to be made publicly available. FIG. 3A illustrates an example of an interface through which the information to be made publicly accessible can be specified by an administrator, while FIG. 3B illustrates how the information may be shown on another interface that is accessible to individuals whose activities may be monitored. These interfaces may be altered—for example, in terms of size, format, or content—based on the manner in which these interfaces are accessed. For example, the interface shown in FIG. 3B may be formatted as a website or file in Portable Document Format ("PDF") format depending on the nature of the computing device on which the interface is viewed. As another example, the interface shown in FIG. 3A may be altered (e.g., by only presenting toggles for the topics deemed most sensitive) to account for the nature of the computing device on which the interface is viewed. Accordingly, these interfaces may be dynamically adjusted to accommodate different form factors while prioritizing display of the most important information.

An administrator may be able to decide whether to disclose to individuals who enter a surveilled environment what activities are being monitored, how the environment is being surveilled, etc. In FIG. 3A, for example, the administrator is able to configure publicly shared organizational details such as that video of the surveilled environment is being recorded, that access events are being recorded, and that air quality determinations are being recorded. Which of these organizational details are configurable may depend on the edge devices included in the corresponding surveillance system. For example, if the surveillance system does not include any air quality sensors, then the administrator may not be presented with the option to configure disclosure on the interface shown in FIG. 3A. Some organizational details may also be more configurable than others. For example, for access control events, the administrator may only be permitted to configure whether or not to disclose that such access control events are being recorded. However, for video recordings, the administrator may be able to configure whether or not to disclose the number of days that video recordings are saved and/or whether face recognition is being applied to those video recordings.

Figure 4:
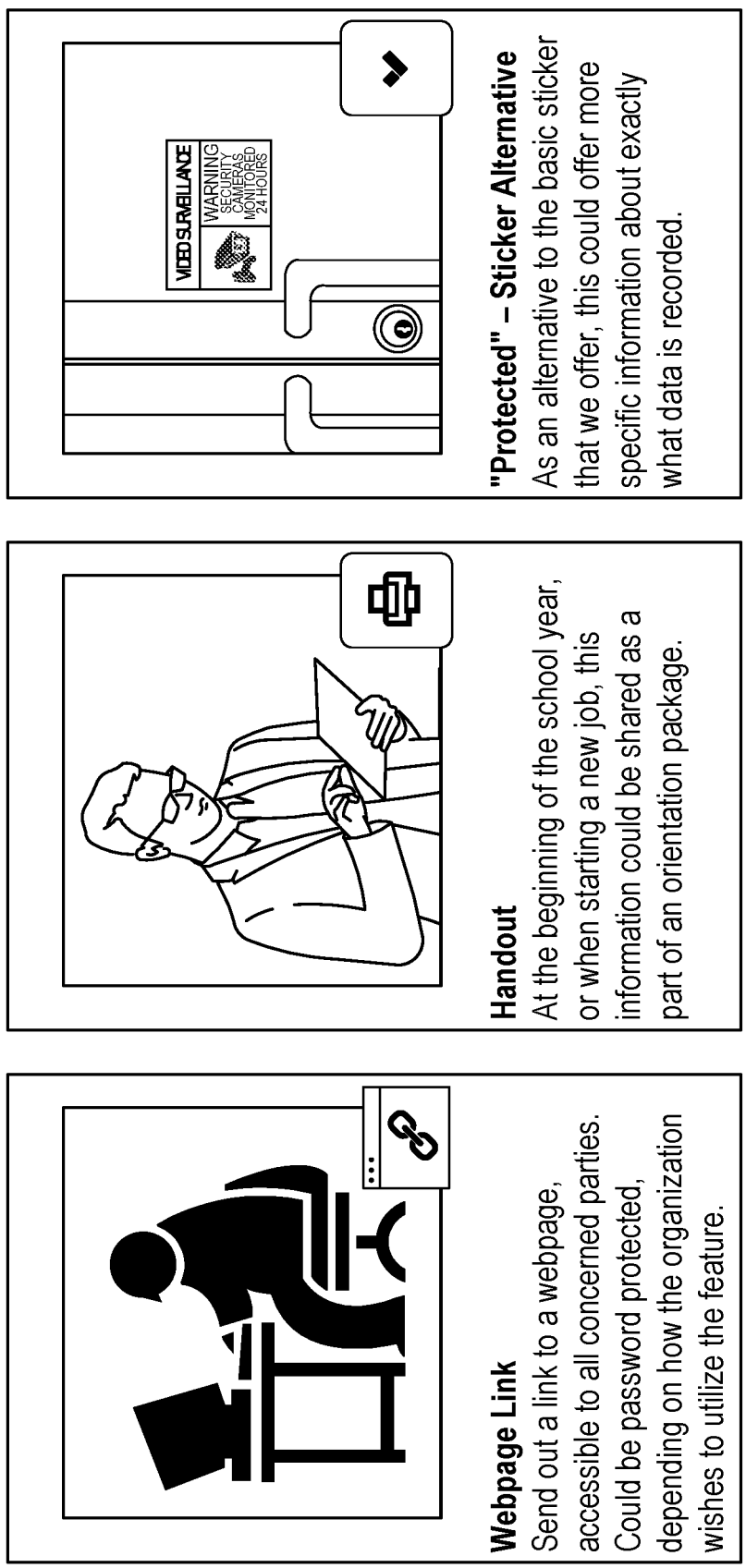
FIG. 4 illustrates how security information could be distributed via hyperlinks to websites, physical handouts, or visual indicia located proximate to the environments under surveillance.

Another key consideration is how to distribute pertinent security information to users. FIG. 4 illustrates how security information could be distributed via hyperlinks to websites, physical handouts, or visual indicia located proximate to the environments under surveillance.

One option is to distribute security information via a hyperlink (or simply "link") to a website. Specifically, a link to a website may be provided, or otherwise made accessible, to all concerned parties. The link could be posted to a widely accessible website (e.g., that is associated with a manufacturer of the surveillance system), or the link could be included in communications (e.g., text messages or email messages) that are provided to users (e.g., upon accessing environments under surveillance, or upon registering to access those environments). Each link could be password protected, depending on how the corresponding organization wishes to utilize the public disclosure feature.

Another option is to distribute security information via physical handouts. In some embodiments, the physical handouts include the security information itself. For example, when a student begins the school year, security information related to a surveillance system employed by a school could be shared as part of an orientation package. As another example, when an employee starts a new job, security information related to the employer could be shared as part of an orientation package. In other embodiments, the physical handouts serve as a mechanism for accessing the security information. For example, a physical handout could include a link to a website, or a physical handout could include human-readable text—such as a string of alphanumeric characters—or a machine-readable code—such as a Quick Response ("QR") code or barcode—that, when viewed, directs a user to the security information. Referring again to the aforementioned example, consider a scenario where a parent is prompted to "scan" a physical handout that is included as part of the orientation package for the student. This could be done by a surveillance platform (e.g., surveillance platform 202 of FIG. 2) that is implemented as a standalone computer program or as part of another computer program (e.g., one that is used by the parent to monitor progress of the student, communicate with teachers, etc.). Upon "scanning" the physical handout, the surveillance platform may cause display of the security information.

Another option is to distribute security information via visual indicia located proximate to the environments under surveillance. For example, in contrast to the basic stickers that tend to accompany conventional surveillance systems, a more elaborate sticker could be offered. Like the physical handout, this elaborate sticker could include the security information itself or serve as a mechanism for accessing the security information (e.g., by including human-readable text or a machine-readable code). Thus, the elaborate sticker could offer more specific information about exactly what data is recorded by the corresponding surveillance system, either directly or indirectly.

Figure 5:
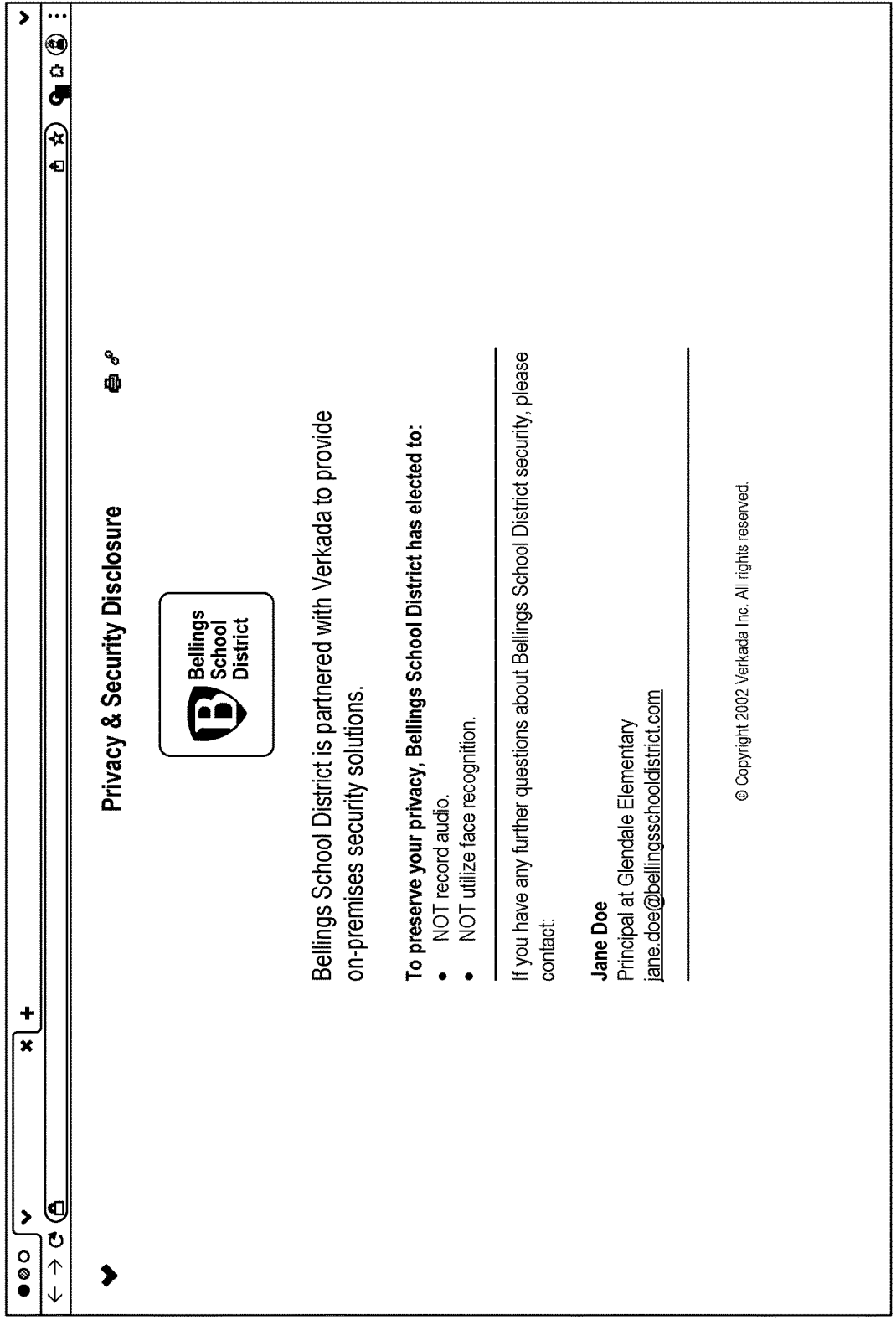
FIG. 5 includes an example of a website that includes (i) organizational information like name, logo, location, and the like; (ii) security information; and (iii) contact information for the appropriate administrator.

FIG. 5 includes an example of a website that includes (i) organizational information like name, logo, location, and the like; (ii) security information; and (iii) contact information for the appropriate administrator. Embodiments of the website could include any combination of this information, as well as other information not shown in FIG. 5. The security information may specify how the organization plans to use data that is generated, examined, or recorded by its surveillance system. The security information could specify how the organization plans to use the data, or the security information could specify how the organization plans to not use the data. Here, for example, the website specifies that Bellings School District does not record audio generated by its edge devices, nor does it utilize face recognition on digital images or video generated by its edge devices. In contrast to conventional approaches—for example, where a sign may simply say "The premises are under surveillance"—such disclosure allows users to have better insight into what data is being gathered by the surveillance system, how that data is being gathered by the surveillance system, and how that data is being used by the surveillance system.

Figure 6:
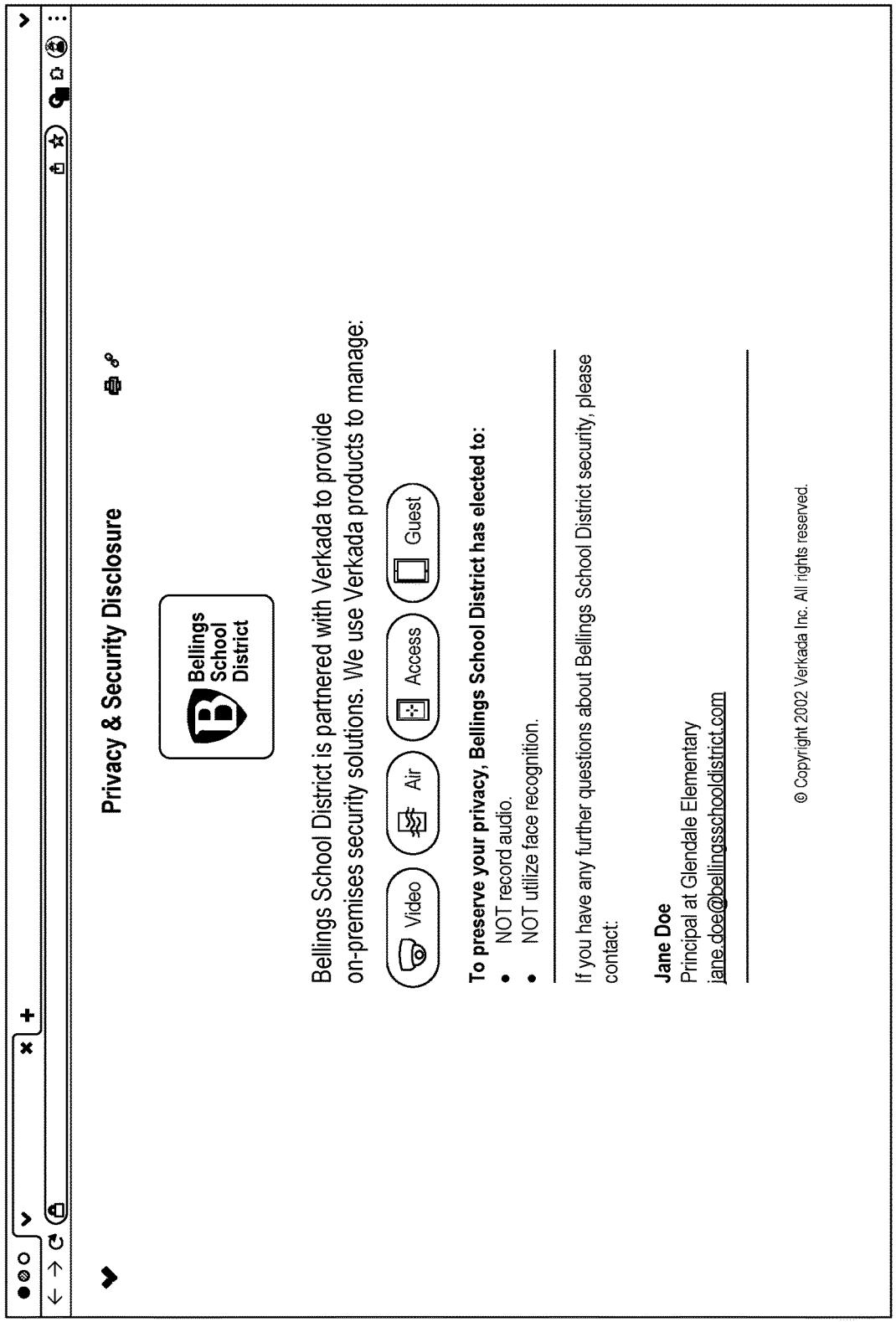
FIG. 6 includes an example of a website that includes the categories of information discussed with reference to FIG. 5, as well as the product categories that are in use by the organization.

FIG. 6 includes an example of a website that includes the categories of information discussed with reference to FIG. 5, as well as the product categories that are in use by the organization to surveil an environment. Here, the website indicates that Bellings School District uses products to monitor video, air quality, access events, and guest access. Generally, the products correspond to the edge devices that are deployed throughout the environment. Note, however, that the organization need not necessarily disclose all of its products, for example, if disclosure may negatively affect safety of its employees and other users of the surveillance system. Said another way, the organization may selectively disclose abilities of its surveillance system so as to not negatively affect safety of those individuals who access the environment (and therefore, are surveilled by the surveillance system). For example, the website may indicate that Bellings School District uses products for access control, though the website may not specify the exact nature of the products to inhibit access by an unauthorized entity. As another example, the website may indicate that Bellings School District generates video recordings of those individuals who access the environment, though the actual location of digital cameras may not be disclosed.

Figure 7:
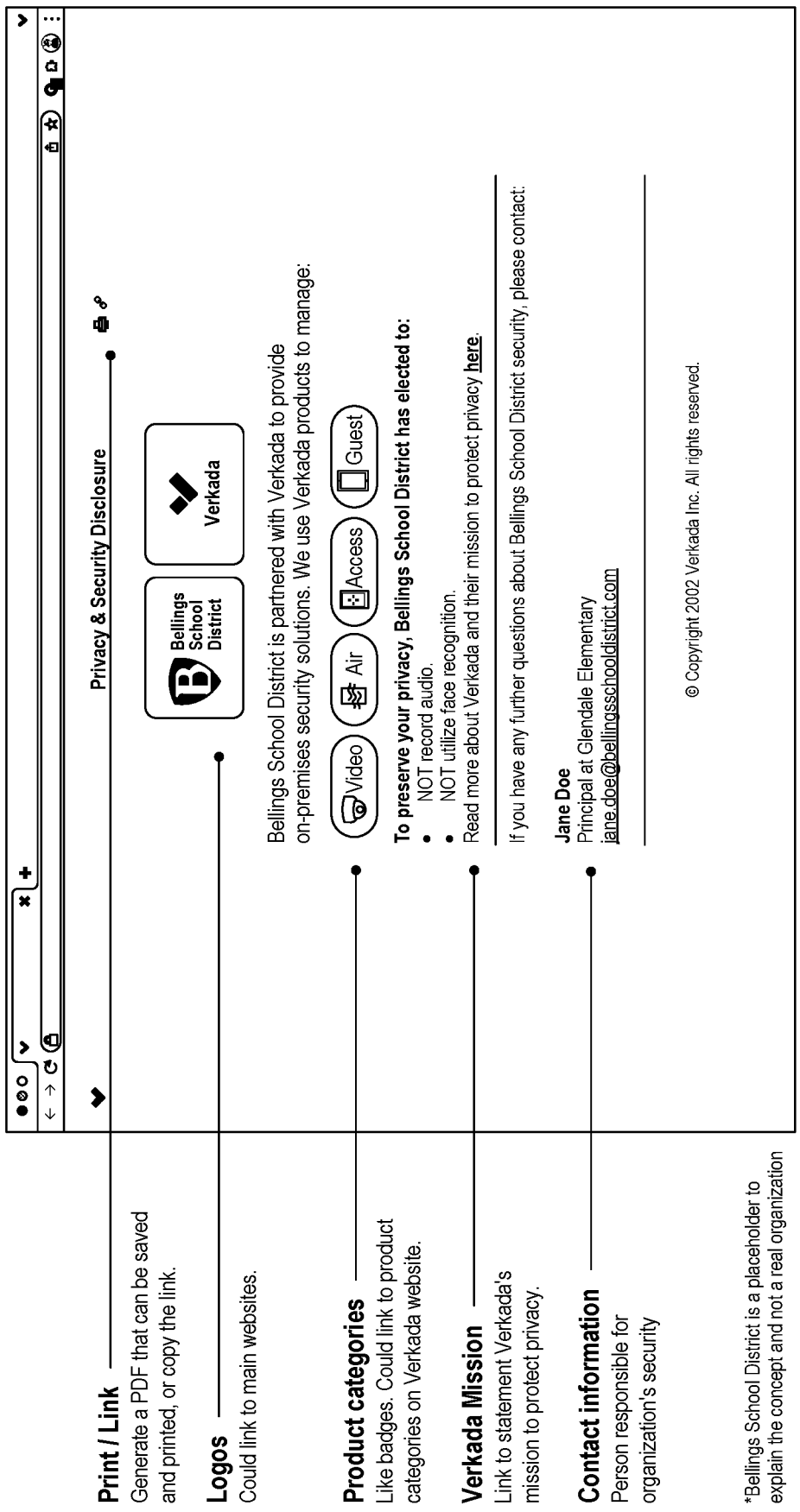
FIG. 7 includes an example of a website that includes the categories of information discussed with reference to FIGS. 5-6.

FIG. 7 includes an example of a website that includes the categories of information discussed with reference to FIGS.

5-6. Here, however, the website also includes information regarding the manufacturer of the surveillance system. Specifically, the website includes logos associated with the manufacturer (Verkada) and organization (Bellings School District) for which the surveillance system is deployed. In some embodiments, these logos may link to more detailed information. For example, the logo associated with the manufacturer may link to a statement—produced by the manufacturer—about privacy.

More detailed information may also be available regarding the categories of products that are part of the surveillance system. In FIG. 7, for example, four different product categories are shown, namely, video, air quality, access events, and guest access. Each product category may be represented by a separate digital badge that, upon being selected, provides more detailed information regarding that product category. Accordingly, the website may be interactive in nature, allowing users to gain more information regarding the surveillance system as desired. For example, in the event that an individual selects the digital badge corresponding to video, the individual may be directed to another website or presented a pop-up notification that specifies how long video recordings are maintained, whether audio is recorded, whether face recognition is utilized, etc. As another example, in the event that an individual selects the digital badge corresponding to air quality, the individual may be directed to another website or presented a pop-up notification that specifies the average air quality measurement over a given timeframe (e.g., a week or month), the most recent air quality measurement, any air quality measurements deemed sufficiently poor (e.g., for exceeding a predetermined threshold) within a given timeframe, etc.

Note that, in FIG. 7, the website includes an option for compiling the contents of the website into a digital file (e.g., in PDF format) that can be readily stored, printed, or transmitted. The website could also be readily shared by the user by copying its address. In some embodiments, the surveillance platform allows the contents of the website to be shared in a more secure manner. For example, a user may be permitted to access the website and download a machine-readable code (e.g., for storage in a native digital wallet) that serves as a representation of the website or its contents. In such embodiments, the machine-readable code not only occupies a small digital "footprint" on whichever computing device is used to access the website, but can also be designed to ensure that the website and its contents are less prone to unauthorized access. For example, the machine-readable code may only permit access if "read" by a computer program associated with the organization. Such an approach may be desirable if, for example, the organization is a school and the website includes information that, while not violating the privacy of any individual student, should not be distributed widely. Parents and students may be able to freely share the machine-readable code because those individuals will have access to the computer program associated with the school; however, other individuals may not be able to access the website or its contents.

Other information could also be posted to, or made accessible from, the websites shown in FIGS. 5-7. One example of such information is statistics related to the corresponding building. Assume, for example, that a website is developed for an organization that has deployed a surveillance system to surveille its building. High-level statistical information that is captured from the building, such as the number of unique visitors over a period of time, the number of total visitors over a period of time, or air quality index, could be posed to a website for review.

FIGS. 8A-C include examples of physical handouts that could be distributed as a means of sharing pertinent security information. While these physical handouts largely resemble the websites shown in FIGS. 5-7, that need not necessarily be the case. These physical handouts could be formatted differently, or these physical handouts could include different types of information.

Figure 9:
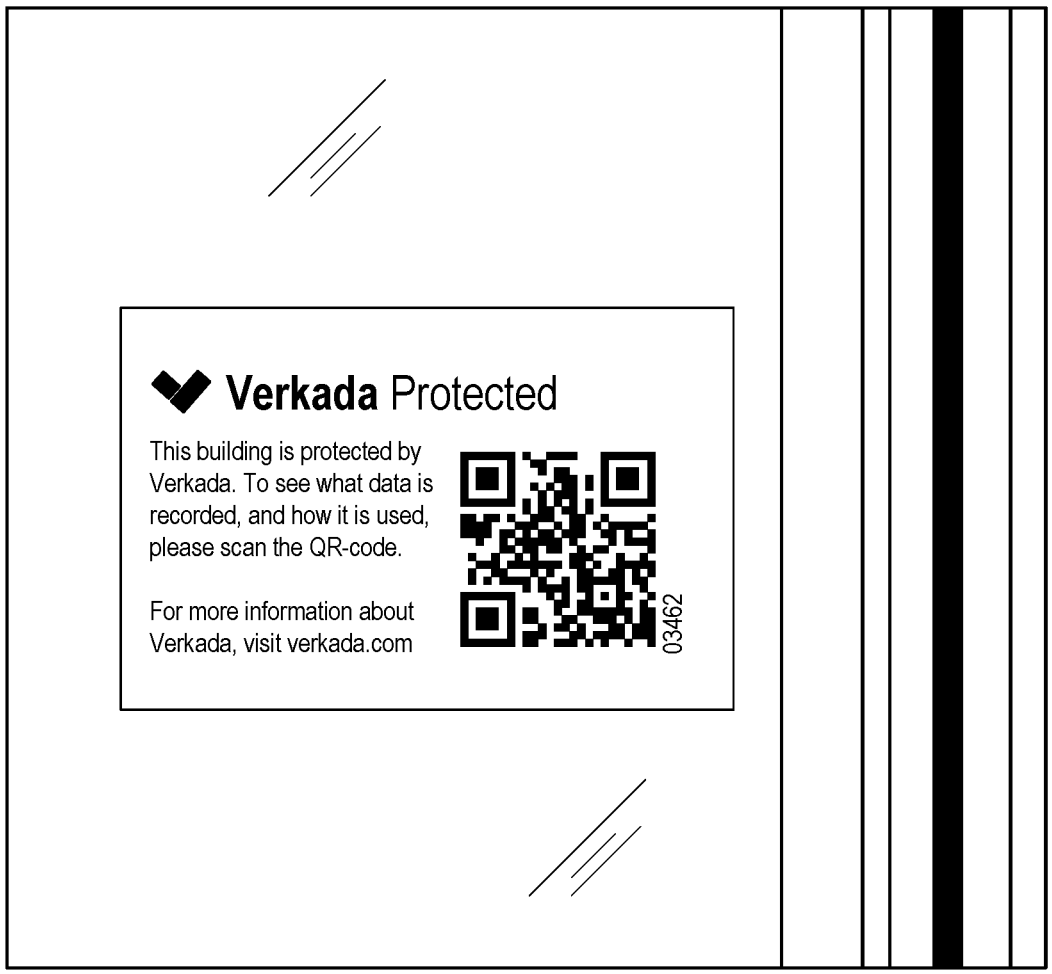
FIG. 9 includes an example of a visual indicium that could be located proximate to the environment that is under surveillance.

FIG. 9 includes an example of a visual indicium that could be located proximate to the environment that is under surveillance. In FIG. 9, the visual indicium is a sticker that includes a QR code that could link to a website with security information, such as one of the websites shown in FIGS. 5-7. Instead of, or in addition to, the QR code, the sticker could include the security information itself much like the websites shown in FIGS. 5-7 and physical handouts shown in FIGS. 8A-C. Other examples of visual indicia include physical signs, digital signs, and the like. Generally, one or more visual indicia are installed proximate to locations, such as doors, at which the environment under surveillance is accessible.

Privacy Disclosure for Purposes of Transparency

Disclosure of security information—or at least an indication of what kind(s) of data may be generated by a surveillance system—can help put privacy and transparency at the forefront for those individuals being monitored without putting the organization at risk. This feature enables organizations to easily design and deploy a customized website that can disclose which edge devices are part (or not part) of its surveillance system and/or which features are used (or not used) in the gathering and examining of data generated by those edge devices. To give organizations a way to make this information easily accessible to the public, the surveillance platform may allow for the dynamic generation of machine-readable codes (e.g., in the form of QR codes) that will direct to the customized website upon scanning. These machine-readable codes may be presented to individuals upon approaching the environment being surveilled or posted for review proximate to the environment being surveilled. In this way, someone walking into an environment that is surveilled using one or more edge devices may be able to scan the corresponding machine-readable code and quickly learn about those edge devices (e.g., whether or not audio is being captured or recorded by digital cameras that visually monitor the environment).

The customizable website may be designed such that each organization can set up its own unique website that displays product and feature usage at the organizational level. This, however, measures that the disclosure may be inaccurate for organizations that have surveillance systems deployed in multiple locations with different edge devices or different feature settings. Consider, for example, an organization that has various offices across the United States and digital cameras installed in these various offices. In order to comply with local or state regulations, facial recognition may only be enabled for a subset of these various offices.

In order to address this issue and make the disclosure feature more widely usable, more granularity may be introduced by the surveillance platform into the setup process. By making the disclosure feature available on a per-site basis, organizations can report specifically on the edge devices and features used within a relevant geographical area (e.g., defined by radius, zip code, state boundary), thereby exposing more accurate information to the public. Additionally, this granularity will help avoid scenarios where the security information that is disclosed is at odds with compliance-driven measured taken by the organization.

Per-site granularity can be achieved in several ways.

First, the surveillance platform may be designed to document or learn appropriate feature settings across a wide variety of sites. Consider, for example, facial recognition in the context of digital images that are generated by digital cameras. The surveillance platform may maintain a data structure that is representative of a record of rules regarding facial recognition across different geographical areas (e.g., states). This data structure could be manually programmed by an administrator, or this data structure could be automatically populated by the surveillance platform, for example, through a study of relevant materials that are available via the Internet. Upon receiving input that specifies the locations of the sites of an organization, the surveillance platform may apply the rules to establish, on a per-site basis, whether to permit facial recognition.

Second, an administrator may be tasked with indicating, to the surveillance platform, appropriate feature settings across a wide variety of sites. For example, upon receiving input that is indicative of a request to create a customized website for an organization, the surveillance platform may prompt the administrator to specify an appropriate feature setting for each site.

In terms of implementation, a feature may be naturally enabled at the organizational level, in which case an administrator may be tasked with identifying the sites for which the feature should be disabled. Alternatively, a feature may be naturally disabled at the organizational level, in which case an administrator may be tasked with identifying the sites for which the feature should be enabled.

Accordingly, a single organization could be associated with multiple disclosures (and therefore, multiple customized websites), and each of the multiple disclosures may be associated with at least one site of the organization. During setup, an administrator may be able to specify the site(s) to which a given disclosure pertains.

Figure 10:
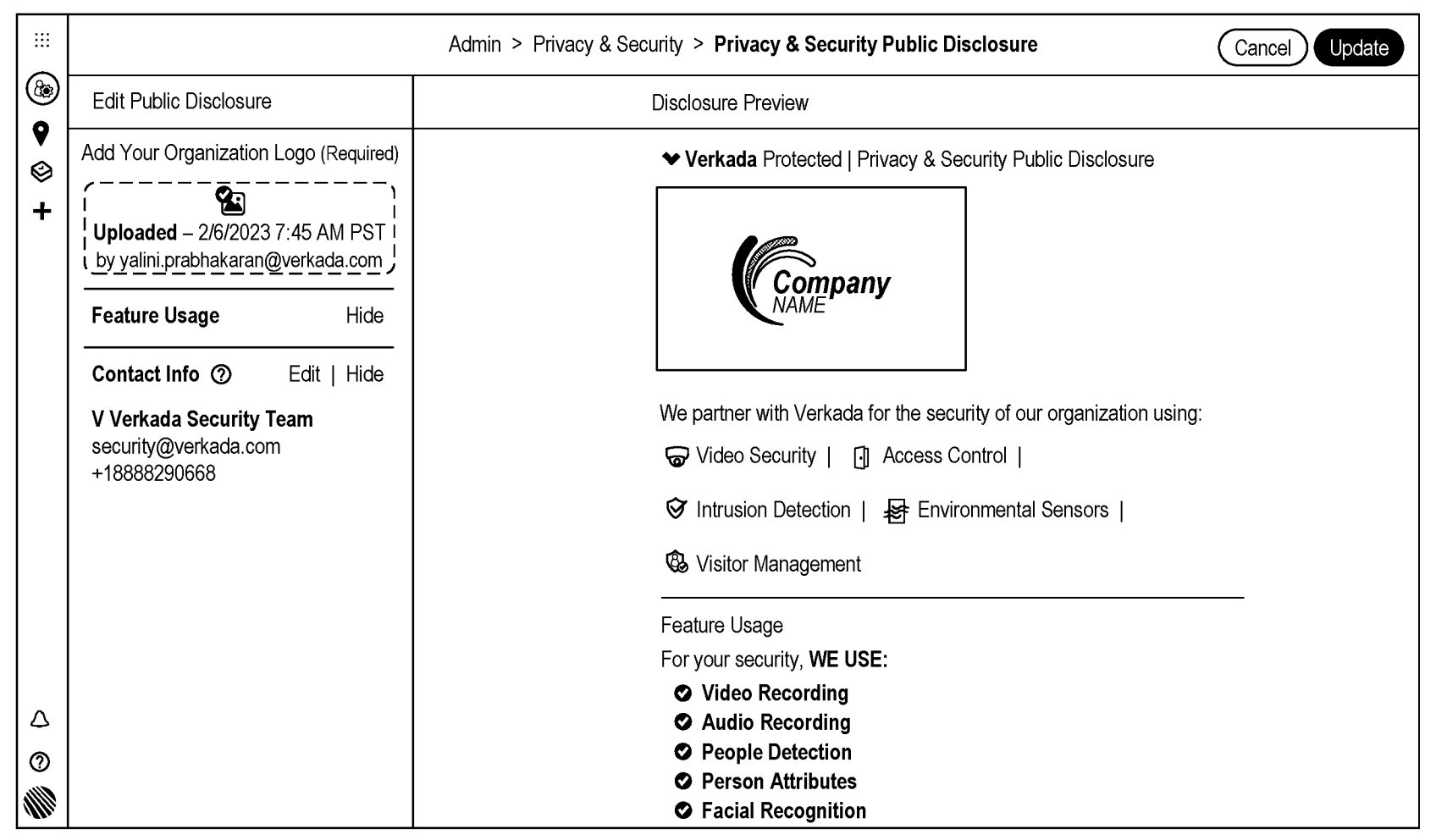

FIG. 10 includes an example of a customizable website that can be used to create a disclosure for an organization. In creating a disclosure, there are three "flows" that are available to an administrator.

First, an "initial state" in which no disclosures have yet been created for that organization. In the initial state, the customizable website may initially open in its "Edit" mode and appropriate product and feature information, as determined by the surveillance platform, can be displayed by default. To exit the initial state, the administrator may be required to input essential information (e.g., feature settings) and then save or publish the now-customized website as a new disclosure.

Second, an "expansion state" in which a new disclosure is being created for an organization that already has at least one existing disclosure. In the expansion state, the customizable website may initially open to the most recently created disclosure as a preview or template and the administrator may be permitted to update this disclosure. To exit the expansion state, the administrator may be required to input essential information (e.g., feature settings) and then save or publish the updated disclosure as a new disclosure. The most notable difference with respect to the initial state, is that the administrator may also have the option of "cancelling" the updated disclosure, in which case the administrator may be taken back to the most recently created disclosure.

Third, an "editing state" in which an existing disclosure is edited. When editing a disclosure, the administrator may be able to change the site(s) to which the disclosure is mapped—and doing so may prompt the surveillance platform to automatically change the displayed product and feature information. To exit the editing state, the administrator may simply "republish" the edited disclosure. Accordingly, administrators may be able to publish, unpublish, and republish disclosures as necessary to ensure the information is kept up to date. In some embodiments, the surveillance platform is designed to assist with this, for example, by monitoring published disclosures to identify situations where review may be necessary (e.g., due to a change in local or state rules, due to a change in the number of employees at a site, due to a change in the nature of work performed at a site).

Administrators may also be permitted to delete existing disclosures.

Methodologies for Creating, Sharing, and Accessing Disclosures

FIG. 11 includes a flow diagram of a process 1100 for creating a visual representation of security information related to a surveillance system that an organization has opted to make accessible. Initially, a surveillance platform can receive input that is indicative of a request, from a user, to create a visual representation for the surveillance system that is employed by the organization to surveil a facility (step 1101). As noted above, the visual representation could be a website, physical handout, or some other visual indicia. For the purpose of illustration, the process 1100 is described in the context of constructing a website that is customized for the organization.

Thereafter, the surveillance platform can cause display of an interface through which the user is able to indicate preferences regarding disclosure of different types of information related to the surveillance system (step 1102). The user may be a representative of the organization, for example. Examples of such an interface are shown in FIGS. 3A and 10. In some embodiments, the surveillance platform displays, on the interface, a predetermined set of preferences, though some preferences may be inactive or inaccessible. For example, the surveillance platform may naturally cause display of a broad list of preferences (e.g., whether to disclose that audio is recorded, whether to disclose that video is recorded, whether to disclose the number of days that videos are saved, whether to employ facial recognition, whether to disclose that facial recognition is employed or not employed, whether to disclose that access events are recorded, etc.); however, the surveillance platform may "gray out" those preferences that are not appropriate (e.g., access control, as shown in FIG. 3A, may be "grayed out" if the surveillance system does not include any access control devices). In other embodiments, the preferences are tailored for the organization. For example, the surveillance platform may examine data being received from, or recorded by, the edge devices of the surveillance system to establish which preferences should be displayed. Thus, the surveillance platform may review data that is received from the surveillance system in order to establish the preferences for which user input is sought through the interface.

Moreover, the surveillance platform may intelligently determine how to customize the interface based on the organization, facility, or a combination thereof. For example the surveillance platform may learn, through analysis of publicly available information, the features that are not permitted in a geographical area that includes the facility. As a specific example, the surveillance platform may learn that a feature (e.g., facial recognition) cannot be employed in a given state without providing notice. In such a scenario, the surveillance platform may indicate, on the interface, that the learned feature is not permitted in the state in response to a determination that the facility is located in the state. As part of its analysis of publicly available information, the surveillance platform may compile rules regarding permissibility of a given feature. For example, the surveillance platform may maintain a data structure of rules that are learned through automated analysis of publicly available information. As a specific example, the surveillance platform may compile rules regarding permissibility of a feature in a data structure; the rules may be learned through automated analysis of publicly available information or input provided by users (e.g., representatives of different organizations), and each of the rules may correspond to a different geographical area.

Then, the surveillance platform can create, based on the preferences, the website that is accessible to individuals (step 1103). The individuals could be representative of the entire public, or the individuals could be representative of a specific subset of the entire public (e.g., employees of the organization). Examples of such interfaces are shown in FIGS. 5-9.

FIG. 12 includes a flow diagram of a process 1200 for accessing security information related to a surveillance system that is employed by an organization to monitor an environment. Generally, the process 1200 is performed by a computer program that is executing on a computing device associated with an individual that enters or nears the environment. However, the individual need not necessarily be proximity to the environment as discussed above.

Initially, a surveillance platform can receive input that is indicative of a request, from a user, for security information that is related to the surveillance system (step 1201). The input could be provided through a computer program that is associated with a network-accessible platform that is responsible for gathering, processing, analyzing, or documenting data that is generated by the edge devices of the surveillance system. This computer program—which may be maintained or supported by a manufacturer of the surveillance system—may be called a "surveillance program" or "surveillance application." Alternatively, the input could be provided through a computer program that is associated with the organization. This computer program—which may be maintained or supported by the organization—may be called an "organization program" or "organization application." Note that in order for the input to be provided through an organization program, the organization program may need to communicate with the surveillance platform.

Thereafter, the computer program—whether a surveillance program or organization program—can query the surveillance platform for security information related to the surveillance system that the organization has opted to make publicly accessible (step 1202). Accordingly, the computer program may transmit, to the surveillance platform via a network (e.g., the Internet), a message that is representative of a request for security information. The computer program can then cause presentation of an interface that includes the information received from the surveillance platform in response to said querying (step 1203). As shown in FIGS. 5-9, the information may specify (i) at least one edge device that is included in the surveillance system, (ii) a medium that is, or is not, recorded by the surveillance system, or (iii) a feature that is, or is not, employed by the surveillance system. This interface may be dynamically altered over time to account for changes in the information that the organization has opted to make publicly accessible. Assume, for example, that the organization adds a new type of edge device to the surveillance system and opts to disclose that the surveillance system includes the new type of edge device. In such a scenario, the interface can be updated in real time to account for the addition. The same process may occur if an existing type of edge device is removed from the surveillance system or if a preference has been changed.

As mentioned above, individuals may be permitted to share security information in some embodiments. Assume, for example, that the computer program receives second input that is indicative of a request, from the user, to transmit the information to another individual. In such a scenario, the computer program may obtain (e.g., from the surveillance platform) a hyperlink that is representative of a digital reference to the website, and the computer program can cause transmission of a communication, with the hyperlink included therein, to another computing device that is associated with the other individual.

FIG. 13 includes a flow diagram of a process 1300 for sharing security information related to a surveillance system employed by an organization to monitor its premises. Initially, a surveillance platform may receive first input that is representative of an approval from the organization to disclose security information related to (i) edge devices that are included in the surveillance system and/or (ii) features of the surveillance system (step 1301). The security information could disclose, for example, the medium(s) that are, or are not, recorded by the edge devices of the surveillance system.

Then, the surveillance platform can receive second input that is representative of an indication that a computing device is proximate to the premises of the organization (step 1302). This indication can take various forms. For example, the indication may be representative of a determination that the computing device has been presented to, or detected by, one of the edge devices. As another example, the indication may be representative of a determination that the computing device is connected to a same network (e.g., an organizational wireless network) as at least one of the edge devices. As another example, the indication may be representative of a determination that the computing device generated an image of a machine-readable code situated proximate to the premises of the organization. The surveillance platform can then cause, in response to receiving the second input, digital presentation of the information, so as to convey the information to a user of the computing device (step 1303). The information could be "pulled" from a server system (e.g., server system 210 of FIG. 2) to a computing device in response to receiving the second input, or the information could be "pushed" from the server system to the computing device on a periodic basis—in which case the information may be retrieved from local memory.

Processing System

Figure 14:
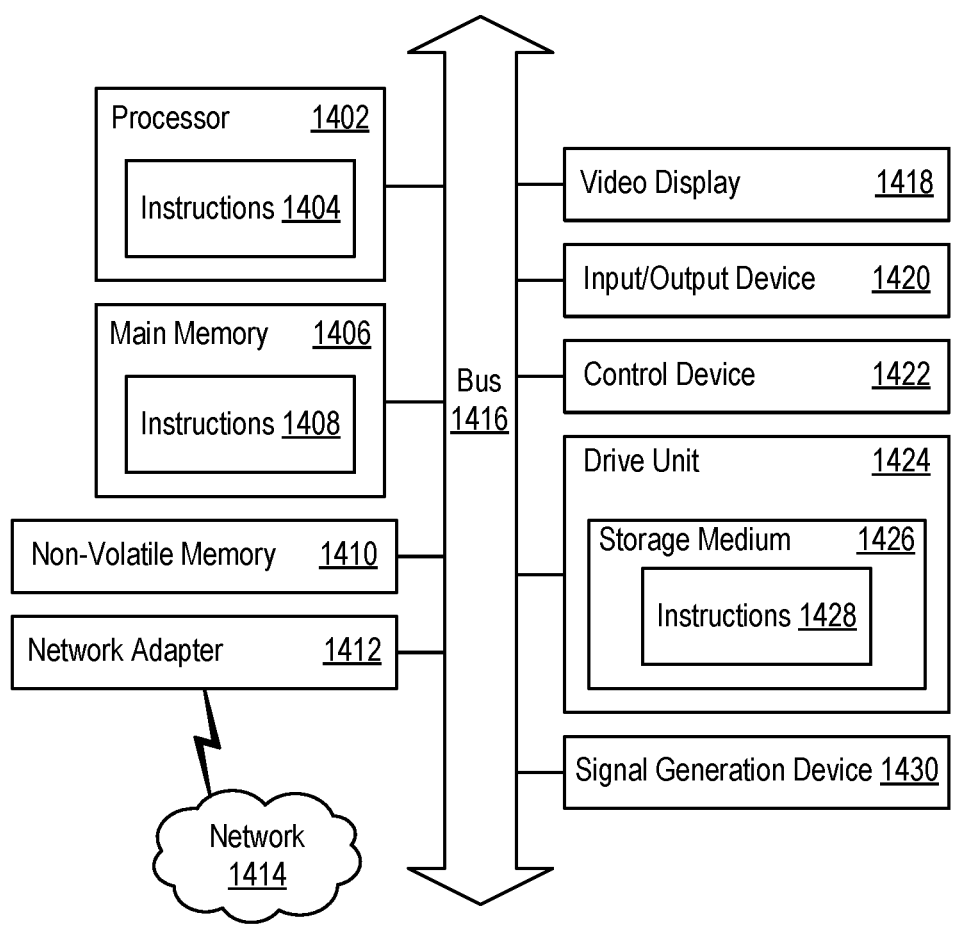
FIG. 14 is a block diagram illustrating an example of a processing system in which at least some operations described herein can be implemented.

FIG. 14 is a block diagram illustrating an example of a processing system 1400 in which at least some operations described herein can be implemented. For example, components of the processing system 1400 may be hosted on an edge device that is part of a surveillance system, a server system that is communicatively connected to the surveillance system, or a computing device on which a surveillance platform is stored and executed.

The processing system 1400 may include a processor 1402, main memory 1406, non-volatile memory 1410, network adapter 1412, display mechanism 1418, input/output device 1420, control device 1422 (e.g., a keyboard, pointing device, or mechanical input such as a button), drive unit 1424 that includes a storage medium 1426, or signal generation device 1430 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, Peripheral Component Interconnect ("PCI") bus, PCI-Express bus, HyperTransport bus, Industry Standard Architecture ("ISA") bus, Small Computer System Interface ("SCSI") bus, Universal Serial Bus ("USB"), Inter-Integrated Circuit ("$I^2C$") bus, or a bus compliant with Institute of Electrical and Electronics Engineers ("IEEE") Standard 1394.

While the main memory 1406, non-volatile memory 1410, and storage medium 1426 are shown to be a single medium, the terms "storage medium" and "machine-readable medium" should be taken to include a single medium or multiple media that stores instructions 1404, 1408, 1428. The terms "storage medium" and "machine-readable medium" should also be taken to include any medium that is capable of storing, encoding, or carrying a set of instructions for execution by the processing system 1400.

In general, the routines executed to implement the embodiments of the present disclosure may be implemented as part of an operating system or a specific computer program. Computer programs typically comprise one or more instructions (e.g., instructions 1404, 1408, 1428) set at various times in various memories and storage devices in a computing device. When read and executed by the processor 1402, the instructions cause the processing system 1400 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile memory and non-volatile memory 1410, removable disks, hard disk drives, optical disks (e.g., Compact Disk Read-Only Memory ("CD-ROM") and Digital Versatile Disks ("DVDs")), cloud-based storage, and transmission-type media such as digital and analog communication links.

The network adapter 1412 enables the processing system 1400 to mediate data in a network 1414 with an entity that is external to the processing system 1400 through any communication protocol supported by the processing system 1400 and the external entity. The network adapter 1412 can include a network adaptor card, a wireless network interface card, a switch, a protocol converter, a gateway, a bridge, a hub, a receiver, a repeater, or a transceiver that includes a wireless chipset (e.g., enabling communication over Bluetooth or Wi-Fi).

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the claimed subject matter and its practical applications, thereby enabling those skilled in the relevant art to understand the claimed subject matter, the various embodiments, and the various modifications that are suited to the uses contemplated.

Although the Detailed Description describes certain embodiments, the technology can be practiced in many ways no matter how detailed the Detailed Description appears. Embodiments may vary considerably in their implementation details, while still being encompassed by the present disclosure. Terminology that is used when describing certain embodiments should not be taken to imply that the terminology is being redefined herein to be restricted to any specific characteristics, features, or aspects of the technology with which that terminology is associated. In general, the terms used in the following claims should not be construed to limit the technology to the specific embodiments described in the Detailed Description, unless those terms are explicitly defined herein. Accordingly, the actual scope of the technology encompasses not only the disclosed embodiments, but also all equivalent ways of practicing or implementing the technology.

The language used in the present disclosure has been principally selected for readability and instructional purposes. It may not have been selected to delineate or circumscribe the technology. It is therefore intended that the scope of the present disclosure be limited not by the Detailed Description, but rather by any claims that issue on an application based hereon. Accordingly, the disclosure of embodiments is intended to be illustrative, but not limiting, of the scope of the technology as set forth in the following claims.

What is claimed is:

1. A method performed by a distributed computer program that is managed by a first organization that manufactures edge devices for surveillance systems, the distributed computer program including (i) a first computer program that is executing on a computer server and (ii) a second computer program that is executing on a computing device associated with an individual, the method comprising:

receiving, by the first computer program, a first input that is representative of an instruction from a second organization whose premises are being monitored by a surveillance system to refrain from performing facial recognition when examining digital images that are generated by edge devices manufactured by the first organization and included in the surveillance system;

receiving, by the first computer program, a second input that is representative of an approval from the second organization to disclose that facial recognition is not being utilized to examine the digital images that are generated by the edge devices manufactured by the first organization and included in the surveillance system;

establishing, by the second computer program, that the computing device is proximate to the premises of the second organization, based on a determination that the computing device is connected to a same network as at least one of the edge devices manufactured by the first organization and included in the surveillance system; and causing, by the second computer program in response to said establishing, digital presentation of an interface that specifies facial recognition is not being utilized to examine the digital images that are generated by the edge devices manufactured by the first organization and included in the surveillance system, so as to convey, by the first organization to the individual, how the digital images generated by the edge devices included in the surveillance system are being examined without presenting the digital images to the individual.

2. The method of claim 1, wherein said establishing is further based on a determination that the computing device generated an image of a machine-readable code situated proximate to the premises of the second organization.

3. The method of claim 1, wherein the interface further specifies a medium that is recorded by at least one of the edge devices manufactured by the first organization and included in the surveillance system.

4. The method of claim 1, wherein the interface further specifies a medium that is not recorded by any of the edge devices manufactured by the first organization and included in the surveillance system.

5. A non-transitory medium with instructions stored thereon that, when executed by a processor of a computing device, causes the computing device to perform operations comprising:
- receiving an input that is indicative of a request, from a user, for information related to a surveillance system that includes edge devices manufactured by a first organization and that is employed by a second organization to monitor an environment;
- querying a network-accessible platform that is maintained by the first organization for information that is related to the surveillance system employed by the second organization and that the second organization has opted to make publicly accessible; and
- in response to a determination that the computing device is connected to a same network as at least one of the edge devices of the surveillance system employed by the second organization,
  - presenting an interface that includes the information, in textual form or graphical form, that is received from the network-accessible platform maintained by the first organization in response to said querying, wherein the information specifies that—
    - (i) video is not recorded by the surveillance system employed by the second organization, or
    - (ii) facial recognition is not employed by the surveillance system employed by the second organization to examine video generated by the edge devices.

6. The non-transitory medium of claim 5, wherein the network-accessible platform maintained by the first organization is responsible for gathering, processing, analyzing, or documenting the video that is generated by the edge devices of the surveillance system.

7. The non-transitory medium of claim 5, wherein the input is provided through a computer program that is executing on the computing device and that is associated with the network-accessible platform maintained by the first organization.

8. The non-transitory medium of claim 5, wherein the input is provided through a computer program that is executing on the computing device and that is associated with the second organization that employs the surveillance system.

9. The non-transitory medium of claim 5, wherein the interface is a website that is accessible via the Internet.

10. The non-transitory medium of claim 9, wherein the operations further comprise:
- receiving a second input that is indicative of a request, from the user, to transmit the information to another individual;
- obtaining a hyperlink that is representative of a digital reference to the website; and
- causing transmission of a communication, with the hyperlink included therein, to another computing device that is associated with the other individual.

11. The non-transitory medium of claim 9, wherein the interface is dynamically altered to account for changes in the information that the second organization has opted to make publicly accessible and that is managed by the network-accessible platform maintained by the first organization.

12. A method performed by a distributed computer program that is managed by a first organization that manufactures edge devices for surveillance systems, the distributed computer program including (i) a first computer program that is executing on a computer server and (ii) a second computer program that is executing on a computing device associated with an individual, the method comprising:
- establishing, by the second computer program, that the computing device is proximate to premises of a second organization, based on a determination that the computing device is connected to a same network as at least one edge device that is manufactured by the first organization and that is included in a surveillance system employed by the second organization to monitor the premises;
- transmitting, by the second computer program in response to said establishing, a query for information that is related to the surveillance system employed by the second organization and that the second organization has opted to make publicly accessible;
- determining, by the first computer program based on an analysis of the information maintained on the computer server, that the second organization has opted to allow disclosure that (i) edge devices included in the surveillance system do not record digital images or (ii) facial recognition is not utilized to examine digital images that are generated by the edge devices of the surveillance system;
- transmitting, by the first computer program, an insight gleaned through analysis of the information that is related to the surveillance system employed by the second organization to the computing device; and
- causing, by the second computer program, digital presentation of an interface to a user of the computing device, the interface indicating whether the edge devices included in the surveillance system record digital images or whether facial recognition is utilized to examine digital images that are generated by the edge devices of the surveillance system.

13. The method of claim 12, wherein said establishing is further based on a determination that the computing device has been presented to, or detected by, one of the edge devices.

14. The method of claim 12, wherein said establishing is further based on a determination that the computing device generated an image of a machine-readable code situated proximate to the premises of the second organization.

15. The method of claim 12, wherein said establishing is further based on a determination that the user has engaged, via the computing device, a hyperlink made accessible by the second organization.

16. The method of claim 12, wherein the second computer program is a mobile application that is executing on the computing device and that is associated with the surveillance system or the second organization.

* * * * *